(12) United States Patent
Baba

(10) Patent No.: US 10,279,256 B2
(45) Date of Patent: May 7, 2019

(54) GAME MEDIUM, METHOD OF USING THE GAME MEDIUM, AND GAME SYSTEM FOR USING THE GAME MEDIUM

(71) Applicant: COLOPL, Inc., Tokyo (JP)

(72) Inventor: Naruatsu Baba, Tokyo (JP)

(73) Assignee: COLOPL, INC., Tokyo (JP)

(*) Notice: Subject to any disclaimer, the term of this patent is extended or adjusted under 35 U.S.C. 154(b) by 42 days.

(21) Appl. No.: 15/462,766

(22) Filed: Mar. 17, 2017

(65) Prior Publication Data
US 2017/0266551 A1 Sep. 21, 2017

(30) Foreign Application Priority Data
Mar. 18, 2016 (JP) ................................ 2016-056316

(51) Int. Cl.
*A63F 13/25* (2014.01)
*A63F 13/428* (2014.01)
(Continued)

(52) U.S. Cl.
CPC .......... *A63F 13/428* (2014.09); *A63F 13/211* (2014.09); *A63F 13/25* (2014.09);
(Continued)

(58) Field of Classification Search
CPC .............................. A63F 13/25; G06T 19/006
See application file for complete search history.

(56) References Cited

U.S. PATENT DOCUMENTS 5,405,152 A * 4/1995 Katanics ................. A63F 13/06
 273/148 B
5,877,748 A * 3/1999 Redlich ................... G06F 3/011
 345/159
(Continued)

FOREIGN PATENT DOCUMENTS

JP 2010-125069 A 6/2010
JP 2011-104170 A 6/2011
JP 2013-257716 A 12/2013

OTHER PUBLICATIONS

TVTropes.org, Breakable Weapons, Jul. 1, 2008, https://tvtropes.org/pmwiki/pmwiki.php/Main/BreakableWeapons, pp. 1-5.*
(Continued)

*Primary Examiner* — Kang Hu
*Assistant Examiner* — Malina D Blaise
(74) *Attorney, Agent, or Firm* — Hauptman Ham, LLP

(57) ABSTRACT

A non-transitory computer readable game medium storing instructions for controlling an operation of a game system. The game system includes a head mounted display (HMD); a processor; a memory; and an input reception device capable of detecting a physical movement of a user. The processor is configured to cause the HMD to display a virtual reality space for forming a game. The processor is configured to cause the HMD to display, in the virtual reality space, a moveable object to be operated by the user in association with the physical movement of the user detected by the input reception device. The processor is configured to give a disadvantage to a player in the game in response to the physical movement of the user exceeding a predetermined velocity in comparison to a case in which the physical movement of the user is equal to or less than a predetermined velocity.

20 Claims, 8 Drawing Sheets

(51) Int. Cl.
*G06T 19/00* (2011.01)
*A63F 13/211* (2014.01)
*G06F 3/01* (2006.01)
*G06T 11/60* (2006.01)
*G06F 3/0338* (2013.01)
*G06F 3/038* (2013.01)

(52) U.S. Cl.
CPC .............. *G06F 3/011* (2013.01); *G06F 3/012* (2013.01); *G06F 3/014* (2013.01); *G06F 3/038* (2013.01); *G06F 3/0338* (2013.01); *G06T 11/60* (2013.01); *G06T 19/006* (2013.01); *A63F 2300/8082* (2013.01)

(56) References Cited

U.S. PATENT DOCUMENTS

| | | | | |
|---|---|---|---|---|
| 6,073,489 | A * | 6/2000 | French | A63B 24/0003 73/379.01 |
| 6,430,997 | B1 * | 8/2002 | French | A63B 24/0003 73/379.04 |
| 7,833,099 | B2 * | 11/2010 | Sato | A63F 13/06 463/37 |
| 8,223,024 | B1 * | 7/2012 | Petrou | G02B 27/017 340/539.13 |
| 8,469,814 | B2 * | 6/2013 | Shimamura | A63F 13/10 463/31 |
| 9,630,105 | B2 * | 4/2017 | Stafford | G06F 3/04815 |
| 9,639,164 | B2 * | 5/2017 | Yamada | G06F 3/017 |
| 9,814,982 | B2 * | 11/2017 | Chuaypradit | A63F 13/577 |
| 9,823,740 | B2 * | 11/2017 | Kim | G06F 3/011 |
| 9,919,206 | B2 * | 3/2018 | Kim | A63F 13/49 |
| 9,939,635 | B2 * | 4/2018 | Thomas | G02B 27/0093 |
| 2002/0072416 | A1 * | 6/2002 | Ohshima | G06F 3/011 463/43 |
| 2003/0032484 | A1 * | 2/2003 | Ohshima | A63F 13/10 463/43 |
| 2008/0012732 | A1 * | 1/2008 | Egashira | A63F 13/00 340/990 |
| 2008/0211768 | A1 * | 9/2008 | Breen | G06F 3/012 345/157 |
| 2009/0069096 | A1 * | 3/2009 | Nishimoto | A63F 13/00 463/43 |
| 2010/0248833 | A1 * | 9/2010 | Okamura | A63F 13/06 463/36 |
| 2010/0259471 | A1 * | 10/2010 | Takano | G02B 27/017 345/156 |
| 2011/0230263 | A1 * | 9/2011 | Ng | A63F 13/28 463/31 |
| 2012/0142415 | A1 * | 6/2012 | Lindsay | G06T 19/006 463/33 |
| 2013/0095926 | A1 * | 4/2013 | Trewartha | A63F 13/06 463/37 |
| 2013/0286004 | A1 * | 10/2013 | McCulloch | G06T 19/006 345/419 |
| 2013/0328928 | A1 * | 12/2013 | Yamagishi | G02B 27/017 345/633 |
| 2014/0018819 | A1 * | 1/2014 | Raj | A61B 34/70 606/130 |
| 2014/0146075 | A1 * | 5/2014 | Takasu | G02B 27/017 345/619 |
| 2014/0201666 | A1 * | 7/2014 | Bedikian | G06F 3/017 715/771 |
| 2014/0240351 | A1 * | 8/2014 | Scavezze | G06F 3/011 345/633 |
| 2014/0364197 | A1 * | 12/2014 | Osman | A63F 13/00 463/24 |
| 2015/0009132 | A1 * | 1/2015 | Kuriya | G06F 3/012 345/156 |
| 2015/0153570 | A1 * | 6/2015 | Yamamoto | H04M 1/72563 345/184 |
| 2015/0273331 | A1 * | 10/2015 | McMain | A63F 13/537 463/31 |
| 2015/0325004 | A1 * | 11/2015 | Utsunomiya | A61B 5/742 382/103 |
| 2015/0352441 | A1 * | 12/2015 | Lin | A63F 13/428 463/36 |
| 2016/0025971 | A1 * | 1/2016 | Crow | G02B 27/0093 345/156 |
| 2016/0030808 | A1 * | 2/2016 | Uchida | G09B 19/0038 482/8 |
| 2016/0034042 | A1 * | 2/2016 | Joo | G02B 27/0172 345/633 |
| 2016/0045828 | A1 * | 2/2016 | Bowron | A63F 13/497 463/31 |
| 2016/0184703 | A1 * | 6/2016 | Brav | G06F 3/012 463/30 |
| 2016/0243443 | A1 * | 8/2016 | Chuaypradit | A63F 13/577 |
| 2016/0364013 | A1 * | 12/2016 | Katz | G06F 3/0304 |
| 2017/0109937 | A1 * | 4/2017 | Koga | G06T 19/006 |
| 2018/0015329 | A1 * | 1/2018 | Burich | G06F 11/3438 |
| 2018/0107277 | A1 * | 4/2018 | Keller | G06F 3/016 |

OTHER PUBLICATIONS

3700 STIC Search Results.*
Decision to Grant a Patent in JP Application No. 2016-056316, dated Aug. 3, 2016.

* cited by examiner

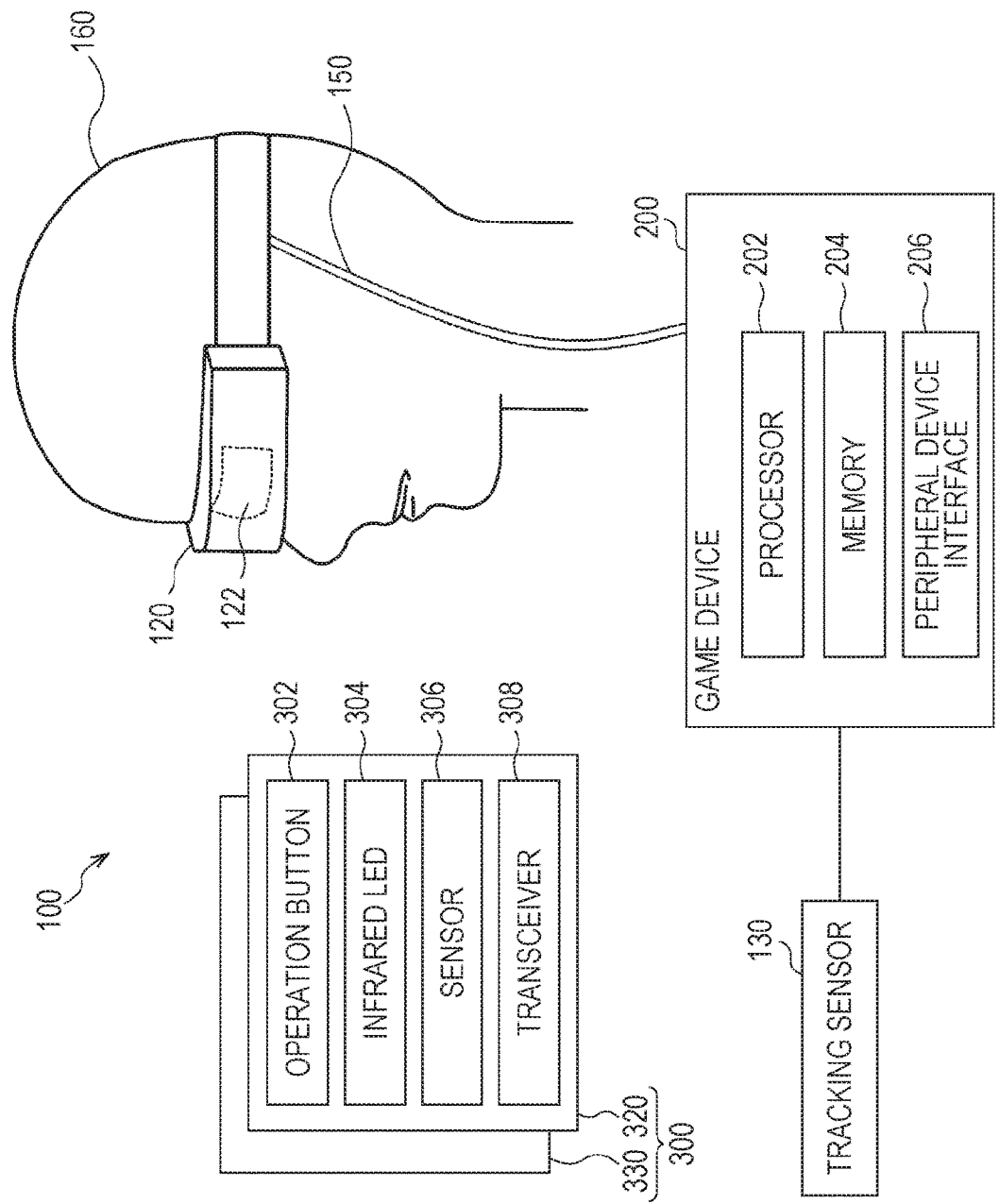

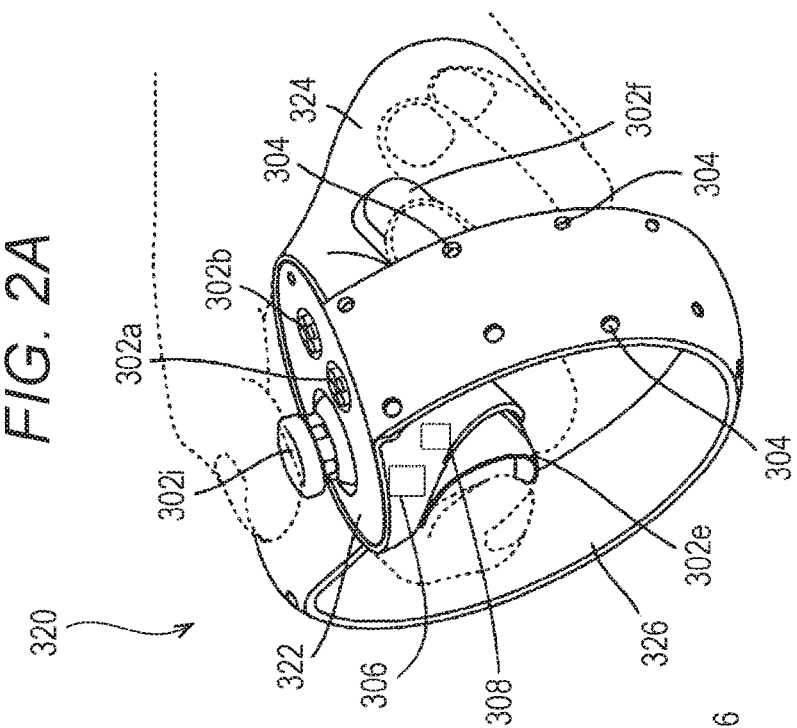
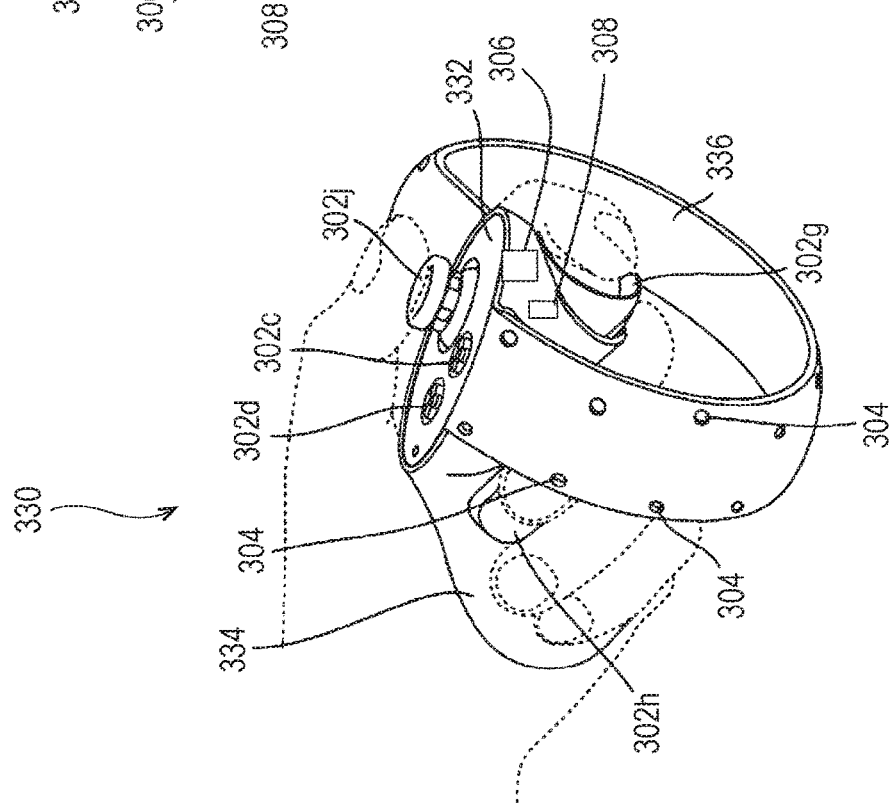

GAME MEDIUM, METHOD OF USING THE GAME MEDIUM, AND GAME SYSTEM FOR USING THE GAME MEDIUM

RELATED APPLICATIONS

The present application claims priority to Japanese Application Number 2016-056316, filed Mar. 18, 2016, the disclosure of which is hereby incorporated by reference herein in its entirety.

BACKGROUND

This disclosure relates to a technology for displaying a virtual reality (hereinafter referred to as "VR") space on a head mounted display (hereinafter also referred to as "HMD") in a game system including the head mounted display.

Use of a HMD capable of displaying a so-called 360-degree panoramic moving image, game screen, and other content in order to cause a user to become more immersed in the VR space is becoming more common. In Japanese Patent Application Laid-open No. 2013-257716, there is described a device for causing a user wearing a head mounted display to be immersed in a video image displayed on the head mounted display to enjoy a game.

In order to further increase the sense of immersion into a game, in some game applications, a player performs an input operation by using, for example, a game controller capable of being grasped by the player; and physical movement, such as by moving the user's hands while holding the game controller or moving the user's body. However, when the player wearing the HMD uses, for example, a game controller to enjoy such games as a competitive game or a sports game, the player may become too immersed in the VR space so that the player may move, for example, the game controller faster than necessary for controlling player movement, in some instances.

SUMMARY

This disclosure has been made in view of the above-mentioned description, and has an object to further improve an experience of a player playing a game.

According to at least one embodiment of this disclosure, there is provided a game medium containing instructions for controlling an operation of a game system including a head mounted display (HMD). The game system includes a processor, a memory, and an input reception device capable of detecting a physical movement of a user. The game system is configured to cause the HMD to display a virtual reality space for forming a game, and cause the HMD to display, in the virtual reality space, a moveable object to be operated by the player in response to the physical movement of the user detected by the input reception device. The game medium includes instructions to cause the processor to execute processing of giving a disadvantage to a player in the game compared to a case in which the physical movement of the user is equal to or less than a predetermined velocity when the physical movement of the user for moving the object in the virtual reality space exceeds the predetermined velocity.

According to at least one embodiment of this disclosure, there is provided a method of causing, by a game system including a HMD, the HMD to display a virtual reality space for forming a game. The game system includes a processor, a memory, and an input reception device capable of detecting a physical movement of a user. The method, which is executed by the processor, includes: causing the HMD to display, in the virtual reality space, a moveable object to be operated by the player in response to the physical movement of the user detected by the input reception device. The method further includes giving a disadvantage to a player in the game compared to a case in which the physical movement of the user is equal to or less than a predetermined velocity when the physical movement of the user for moving the object in the virtual reality space exceeds the predetermined velocity.

According to at least one embodiment of this disclosure, there is provided a game system including a HMD, an information processing device, and an input reception device capable of detecting a physical movement of a user. The information processing device is configured to cause the HMD to display a virtual reality space for forming a game, and to cause the HMD to display, in the virtual reality space, a moveable object to be operated by the user in association with the physical movement of the user detected by the input reception device. The game system includes a processing unit configured to give a disadvantage to a player in the game compared to a case in which the physical movement of the user is equal to or less than a predetermined velocity when the physical movement of the user for moving the object in the virtual reality space exceeds the predetermined velocity.

According to at least one embodiment of this disclosure, the user is prompted to move at a speed so as not to surpass the predetermined velocity, to thereby further improve the experience of the user.

BRIEF DESCRIPTION OF THE DRAWINGS

FIG. 1 is a hardware configuration diagram of a game system according to at least one embodiment.

FIG. 2A and FIG. 2B are each a diagram of an example of an outer shape of a game controller according to at least one embodiment.

DETAILED DESCRIPTION

Figure 3:
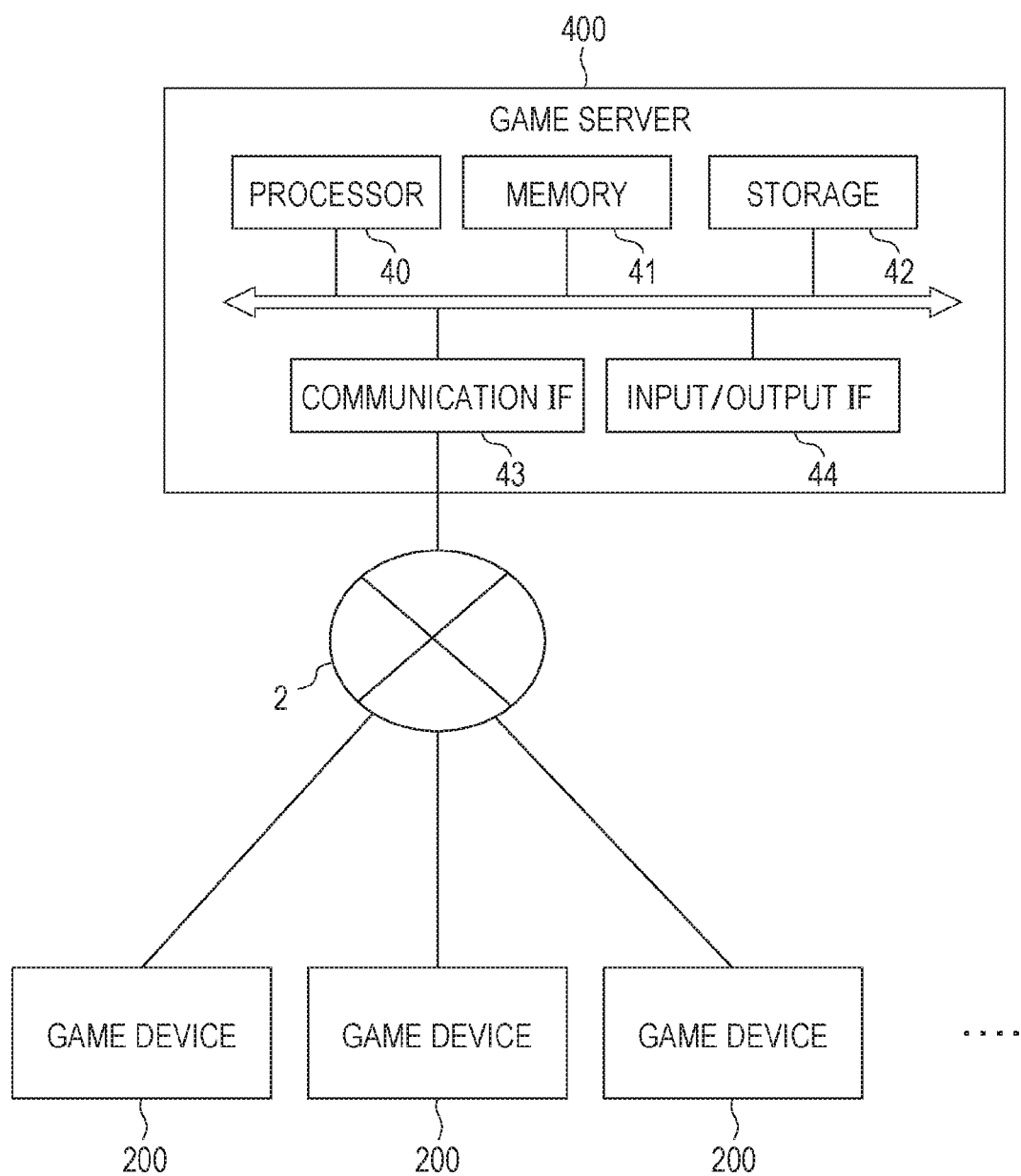
FIG. 3 is a diagram of a game system according to at least one embodiment.

First, specifics of at least one embodiment of this disclosure are listed and described. At least one embodiment of this disclosure is configured as described below.

Item 1

A non-transitory computer readable game medium contains instructions for controlling an operation of a game system. The game system includes a HMD; a processor; a memory; and an input reception device capable of detecting a physical movement of a user. Based on the instructions, the game system is configured to cause the HMD to display a virtual reality space for forming a game. Based on the instructions, the game system is configured to cause the HMD to display, in the virtual reality space, a moveable object to be operated by the user in association with the physical movement of the user detected by the input reception device. Based on the instructions, the processor is configured to give a disadvantage to a player in the game compared to a case in which the physical movement of the user is equal to or less than a predetermined velocity when the physical movement of the user for moving the moveable object in the virtual reality space exceeds the predetermined velocity.

Item 2

A non-transitory computer readable game program according to Item 1, in which the giving the disadvantage to the player includes changing at least one of a state of the moveable object to be operated by the player or a state of a target object to be acted on by the moveable object.

Item 3

A non-transitory computer readable game program according to Item 1 or 2, in which giving the disadvantage to the player includes changing a state of a character object representing the player as the moveable object.

Item 4

A non-transitory computer readable game program according to Item 3, in which giving the disadvantage to the player includes:

changing, as the state of the character object, a parameter set to the player; and causing the HMD to display a visual effect depending on the change of the parameter.

Item 5

A non-transitory computer readable game program according to Item 1 or 2, in which giving the disadvantage to the player includes changing, as the moveable object, a state of a target object to be moved in the virtual reality space in association with the physical movement of the user, the target object being associated with a game character to be operated by the user.

Item 6

A non-transitory computer readable game program according to Item 5, in which giving the disadvantage to the player includes:

degrading a state of the target object; and causing the HMD to display a visual effect depending on the degraded state of the target object.

Item 7

A non-transitory computer readable game program according to Item 2, in which giving the disadvantage to the player includes changing the state of the moveable object.

Item 8

A non-transitory computer readable game program according to any one of Items 1 to 7, in which the input reception device is configured to be held or worn by the user, in which the input reception device includes at least one of a velocity detector for detecting a velocity of the input reception device or an acceleration detector for detecting an acceleration of the input reception device, and in which giving the disadvantage to the player includes determining based on an output of the input reception device whether or not the physical movement of the user has exceeded the predetermined velocity.

Item 9

A method of causing, by a game system including a head mounted display (HMD), the HMD to display a virtual reality space for forming a game. The game system includes a processor; a memory; and an input reception device capable of detecting a physical movement of a user. The method, which is executed by the processor, includes causing the HMD to display, in the virtual reality space, a moveable object to be operated by the user in association with the physical movement of the user detected by the input reception device. The method further includes giving a disadvantage to a player in the game compared to a case in which the physical movement of the user is equal to or less than a predetermined velocity when the physical movement of the user for moving the object in the virtual reality space exceeds the predetermined velocity.

Item 10

A game system including a head mounted display (HMD); an information processing device; and an input reception device capable of detecting a physical movement of a player. The information processing device is configured to cause the HMD to display a virtual reality space for forming a game. The information processing device is further configured to cause the HMD to display, in the virtual reality space, a moveable object to be operated by the user in association with the physical movement of the user detected by the input reception device. The game system is configured to give a disadvantage to a player in the game compared to a case in which the physical movement of the user is equal to or less than a predetermined velocity when the physical movement of the user for moving the object in the virtual reality space exceeds the predetermined velocity.

Specific examples of a non-transitory computer readable game program according to at least one embodiment of this disclosure are described below with reference to the drawings. This disclosure is not limited to those examples, and is defined by the appended claims. One of ordinary skill in the art would understand that this disclosure includes all modifications within the appended claims and the equivalents thereof. In the following description, like elements are denoted by like reference symbols in the description of the drawings, and redundant description thereof is omitted.

FIG. 1 is a hardware configuration diagram of a game system. 100 according to at least one embodiment of this disclosure. The game system 100 executes instructions contained in a non-transitory computer readable game medium to provide a user 160 with a gaming experience. In at least one embodiment, a movement of the user 160 is associated with a movement of an object in the game. As illustrated in FIG. 1, the game system 100 includes a game device 200, a display device 120, a game controller 300 (hereinafter also simply referred to as "controller"), and a tracking sensor 130. The game device 200 and the display device 120 are electrically connected to each other via, for example, a wired cable 150 for mutual communication. Wireless connection may be used instead of the wired cable 150. Similarly, the game device 200 is connected to the controller 300 and the tracking sensor 130 in a wired or wireless manner.

The game device 200 is a device configured to generate a game image or a game sound based on instructions in a non-transitory computer readable game medium. The game device 200 includes at least a processor 202, a memory 204, and a peripheral device interface 206. In addition to those components, the game device 200 may further include as other components a network interface (not shown) for communicating to/from other devices via a network (for example, the Internet) or a user input interface (for example, keyboard and mouse) (not shown) for receiving operation input to the game device 200 from the player 160. The game device 200 can be realized not only as a game console dedicated to a non-transitory computer readable game medium but also as a personal computer, a tablet terminal, a smartphone, or the like.

The memory 204 stores at least an operating system and instructions of a non-transitory computer readable game medium, herein after called a computer game program. The operating system is a set of instructions for controlling an operation of the game device 200. The computer game program is set of instructions for the game device 200 to implement respective functions of game processing described later. The memory 204 may further store data generated by an operation of the game device 200 temporarily or permanently. Specific examples of the memory 204 include a read only memory (ROM), a random access memory (RAM), a hard disk, a flash memory, and an optical disc.

The processor 202 is configured to read a information stored in the memory 204 and to execute processing in accordance with the instructions. Execution of the computer game program stored in the memory 204 by the processor 202 implements the respective functions of game processing described later. The processor 202 includes a central processing unit (CPU) and a graphics processing unit (GPU).

The peripheral device interface 206 is configured to provide the game device 200 with a capability of communicating to/from a peripheral device. As described above, the game device 200 includes, as peripheral devices, the display device 120, the controller 300, and the tracking sensor 130. The game device 200 can exchange data with the display device 120, the controller 300, and the tracking sensor 130 via the peripheral device interface 206. The connection scheme supported by the peripheral device interface 206 includes wired connection or a wireless connection.

The display device 120 is a device for providing the user 160 with a game image generated in the game device 200 as visual information. For example, the display device 120 may be configured as a head mounted display (HMD) as illustrated in FIG. 1. In other cases, the display device 120 may be configured as a normal standing display that is not an HMD.

As illustrated in FIG. 1, when the display device 120 is an HMD (in the following, "display device 120" may be referred to as "HMD 120" when the display device 120 is an HMD), the HMD 120 is mounted on the head of the user 160 so as to cover the field of view of the user 160. The HMD 120 includes a display 122 arranged in front of the eyes of the user 160 wearing the HMD 120. The display 122 is configured to display a game image transmitted from the game device 200. The display 122 may be configured as, for example, a non-transmissive display or a partially transmissive display. In this case, a scene of the outside world of the HMD 120 is shut off (or partially shut off) from the field of view of the user 160 so that only the game image displayed on the display 122 is delivered to the eyes of the user 160. The game image displayed on the display 122 of the HMD 120 may be, for example, an image representing a virtual reality space formed by a computer game. The HMD 120 having adopted the non-transmissive display (or partially transmissive display) therein as the display 122 enables the user 160 to experience a sensation (sense of immersion) of entering the virtual reality space of the computer game with such a virtual reality space image.

The HMD 120 may also include a sensor (not shown) (for example, any one of a magnetic sensor, an angular velocity sensor, an acceleration sensor, or a combination thereof) for detecting the direction in which the head of the user 160 wearing the HMD 120 faces. The detected head orientation of the user 160 may be used to change the display image of the display 122 so as to follow the movement when the user 160 moves the head. With this, a sense of immersion in the virtual reality space felt by the user 160 is increased. The HMD 120 may further include a speaker (headphones) (not shown) for outputting a game sound generated in the game device 200.

The controller 300 is a device to be used by the user 160 to control the movement of an object in the computer game. FIG. 2A and FIG. 2B are each a diagram of an example of an outer shape of the controller 300, and FIG. 2A and FIG. 2B are referred to in the following description. The controller 300 includes a right hand controller 320 to be held and used by the user 160 with the right hand and a left hand controller 330 to be held and used by the user 160 with the left hand. The right hand controller 320 and the left hand controller 330 are provided as separate devices. Thus, the user 160 can move the right hand holding the right hand controller 320 and the left hand holding the left hand controller 330 freely independently of each other. The right hand controller 320 and the left hand controller 330 each include an operation button 302, an infrared light emitting diode (LED) 304, a sensor 306, and a transceiver 308. As described later, only one of the infrared LED 304 and the sensor 306 may be provided selectively.

The operation button 302 is a group of a plurality of buttons configured to receive operation input from the user 160. For example, the operation button 302 includes a push button, a trigger button, and an analog stick. The push button is a button configured to be operated by a movement of pressing with a finger (for example, the thumb). For example, two push buttons 302a and 302b are arranged on a top surface 322 of the right hand controller 320, and two push buttons 302c and 302d are arranged on a top surface 332 of the left hand controller 330. The trigger button is a button configured to be operated by a movement such as pulling a trigger with the index finger or the middle finger. For example, the right hand controller 320 has a trigger button 302e and a trigger button 302f arranged on a front surface and a side surface of a grip 324, respectively. In addition, the left hand controller 330 has a trigger button 302g and a trigger button 302h arranged on a front surface and a side surface of a grip 334, respectively. The trigger buttons 302e, 302f, 302g, and 302h are assumed to be operated with the right index finger, the right middle finger, the left index finger, and the left middle finger, respectively. The analog stick is a stick button capable of being operated by being tilted in an arbitrary direction by 360 degrees from a predetermined neutral position. For example, an analog stick 302i and an analog stick 302j are arranged on the top surface 322 of the right hand controller 320 and the top surface 332 of the left hand controller 330, respectively. The analog sticks 302i and 302j are assumed to be operated with the thumbs of the right hand and the left hand, respectively.

The right hand controller 320 and the left hand controller 330 include frames 326 and 336 each extending in a direction opposite to the top surface (322 or 332) from both side surfaces of the grip (324 or 334) to form a semicircular ring, respectively. The plurality of infrared LEDs 304 are embedded in an outer surface of each frame 326 or 336. For example, the plurality of (for example, about ten) infrared LEDs 304 are arranged in a row along the circumferential direction of each frame 326 or 336. The infrared LEDs 304 may be arrayed in a plurality of rows (for example, two rows) along the circumferential direction of each frame 326 or 336. When the user 160 holds the controller 300, fingers of the user 160 are between the grip (324 or 334) and the frame (326 or 336). Thus, the infrared LEDs 304 arranged on the outer surface of each frame 326 or 336 are not covered by the hands and fingers of the user 160. In addition to the outer surfaces of the frames 326 and 336, the infrared LEDs 304 may also be embedded in portions of the surfaces of the grips 324 and 334 that are not hidden by the fingers of the user 160. Those infrared LEDs 304 are configured to emit infrared light during play of a computer game. The infrared light emitted from the infrared LED 304 can be used to detect the position and attitude (inclination and orientation) of each of the right hand controller 320 and the left hand controller 330.

In order to enable detection of the position and attitude of each controller 320 or 330, the right hand controller 320 and the left hand controller 330 have the built-in sensors 306 instead of or in addition to the infrared LEDs 304. The sensor 306 may be, for example, any one of a magnetic sensor, an angular velocity sensor, an acceleration sensor, or a combination thereof. When the user 160 holds and moves the controllers 320 and 330 with the right hand and the left hand, respectively, the sensor 306 outputs values (magnetic, angular velocity, or acceleration values) depending on the orientation and movement of each controller 320 or 330. Through processing of the values output from the sensor 306 by an appropriate method, the position and attitude of each of the right hand controller 320 and the left hand controller 330 is detected. Information on the velocity and displacement of the controller can be obtained by integrating the data of the acceleration sensor. The acceleration sensor may be a three-axis acceleration sensor. Through use of this three-axis acceleration sensor, not only changes in acceleration with respect to three directions, namely, front and rear, right and left, and up and down directions, but also the inclination of the controller can be detected.

The transceiver 308 of each controller 320 or 330 is configured to transmit and receive data to/from the game device 200. For example, the transceiver 308 transmits to the game device 200 data based on the operation input given by the user 160 to the controller via the operation button 302. In addition, the transceiver 308 receives from the game device 200 a command instructing the controller to cause emission of light from the infrared LED 304. Further, the transceiver 308 transmits data corresponding to various values detected by the sensor 306 to the game device 200. In addition to the transmission and reception of those pieces of data, when each controller includes a vibrator for transmitting to the hands of the user 160 haptic feedback due to vibration, the transceiver 308 may receive from the game device 200 a command to cause the vibrator to transmit haptic feedback. Preferably, the transceiver 308 is configured to transmit and receive data via wireless communication so that the user 160 can freely move the hands holding the respective controllers 320 and 330.

The tracking sensor 130 is a device configured to detect the infrared light emitted from the infrared LED 304 of each of the right hand controller 320 and the left hand controller 330, and to track the movement of each controller. For example, the tracking sensor 130 may be configured as an infrared camera that takes an image in the infrared wavelength region, and may transmit data of the taken image to the game device 200. The image taken by the infrared camera is a bright/dark image reflecting the arrangement of a large number of the infrared LEDs 304 embedded in the surface of each controller 320 or 330, in at least one embodiment. The position and attitude (inclination and direction) of each of the right hand controller 320 and the left hand controller 330 are detected based on this bright/dark image. As an example, the plurality of infrared LEDs 304 are arranged in a row on the frame 326 or 336 of each controller. The position and attitude of each controller can be detected by identifying the alignment of bright points corresponding to this row of infrared LEDs 304 in the image taken by the infrared camera.

FIG. 3 is a diagram of a game system according to at least one embodiment of this disclosure.

The game devices 200 of a plurality of users and a game server 400 are connected to a network 2. The game device 200 is configured to receive content such as games and movies from the game server 400 via the network 2 to a corresponding user, e.g., user 160. The game server 400 is configured to provide the game device 200 with an application, for example, an online game in which a plurality of users can participate in simultaneously via the network 2. The network 2 may include the Internet, various types of mobile communication systems (for example, so-called 3G or 4G mobile communication systems or Long Term Evolution (LTE)) constructed by a radio base station (not shown), or a wireless network (for example, Wi-Fi® that enables connection to the Internet via a predetermined access point.

In at least one embodiment, the game server 400 is a computer such as a workstation or a personal computer. The game server 400 includes a processor 40, a memory 41, a storage 42, a communication interface (IF) 43, and an input/output IF 44, which are electrically connected to one another via a communication bus.

The processor 40 includes a central processing unit (CPU), a micro processing unit (MPU), a graphics processing unit (GPU), or the like, and is configured to control the game server 400.

The memory 41 includes a main storage device that can be constructed by a volatile storage device such as a read only memory (ROM) or a random access memory (RAM). The storage 42 includes an auxiliary storage device that can be constructed by a nonvolatile storage device such as a flash memory or a hard disk drive (HDD). The memory 41 is configured to permanently or temporarily store various programs and data loaded from the storage 42 and provide a work area to the processor 40. Game data, for example, a game program, is stored in the storage 42 of the game server 400. The game program is loaded into the memory 41 to be executed by the processor 40. Various game data generated while the processor 40 is operating in accordance with the game program is also temporarily stored in the memory 41.

The communication IF 43 of the game server 400 has a communication control function for transmitting and receiving various kinds of data to/from the game devices 200. The communication control function includes, for example, a wireless LAN connection function, an Internet connection function via a wired or wireless LAN or a mobile phone network, or a short distance wireless communication function. In at least one embodiment, the data contains game data such as a predetermined game program, user information, and game information, and contains instructions such as for transmission and reception of game data between the game devices 200 and the game server 400 and for progress of the game.

The input/output IF 44 of the game server 400 includes an input unit, which is an information input device such as a mouse or a keyboard, and an output unit, for example, a liquid crystal display, and is used for monitoring computer information.

The game server 400 may include at least a part of the above-mentioned functions of the game device 200. Further, the game device 200 may include at least a part of the above-mentioned functions of the game server 400. That is, a computer that implements a predetermined function by executing the game program in at least one embodiment can be selected from either of an information control device or other devices including the game device 200 or the game server 400 described above.

Figure 4:
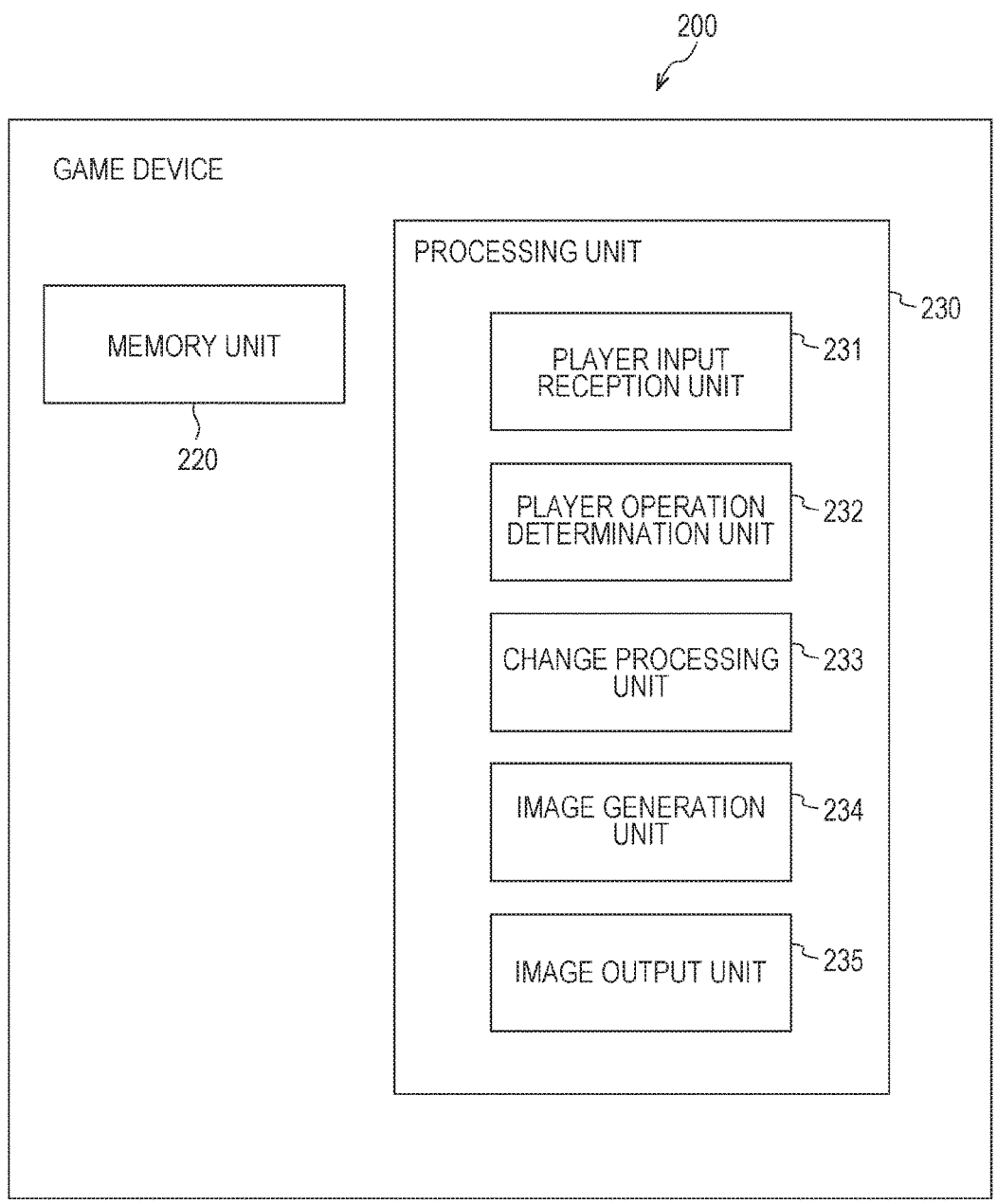
FIG. 4 is a functional diagram of a game device of a game system according to at least one embodiment.

FIG. 4 is a block diagram of a functional configuration of the game device 200 according to at least one embodiment of this disclosure. The game device 200 includes a memory unit 220 and a processing unit 230. The processing unit 230 further includes a user input reception unit (operation information reception means) 231, a user operation determination unit (determination means) 232, a change processing unit (change processing means) 233, an image generation unit 234, and an image output unit 235. The memory unit 220 corresponds to the memory 204 illustrated in FIG. 1. The processing unit 230 and the respective units 231 to 235 included in the processing unit 230 represent functions of the game processing according to this disclosure, which are implemented by the processor 202 illustrated in FIG. 1 reading and executing the computer game program stored in the memory 204.

The player input reception unit 231 is configured to detect the attitude (inclination, orientation, and position) of each of the right hand controller 320 and the left hand controller 330 to acquire operation information on the operation performed by the player. For example, the right hand controller 320 and the left hand controller 330 are held in their home positions with their respective top surfaces 322 and 332 oriented horizontally in their initial states, for example, at the beginning of the computer game. When the computer game is started, the user 160 can operate the right hand controller 320 and the left hand controller 330 in various directions to control the movement of an object in the computer game.

The user input reception unit 231 separately detects and acquires the operation information on each controller 320 or 330. For example, the user input reception unit 231 may use taken-image data output from the tracking sensor (infrared camera) 130. The user input reception unit 231 identifies bright points in the taken image. As described above, bright points in the image taken by the infrared camera correspond to the infrared LEDs 304 arranged in the controller. The user input reception unit 231 detects the attitude of the right hand controller 320 and the attitude of the left hand controller 330 based on the direction in which the plurality of identified bright points are arranged in the taken image, to thereby acquire the operation information of the user.

Instead of the taken-image data acquired from the tracking sensor 130, the user input reception unit 231 may use the detection data of the sensor 306 received from each controller 320 or 330 for detection of the operation of each controller. For example, the three-axis angular velocity sensor (sensor 306) of the right hand controller 320 detects rotation of the right hand controller 320 about three orthogonal axes. The user input reception unit 231 may determine the direction in which the right hand controller 320 has rotated and its rotation amount based on this detection data, and then accumulate the sequentially determined rotation direction and rotation amount, to thereby calculate the attitude of the right hand controller 320. Similarly, the user input reception unit 231 may calculate the attitude of the left hand controller 330 using the detection data output from the three-axis angular velocity sensor of the left hand controller 330. In addition to the detection data from the three-axis angular velocity sensor, the user input reception unit 231 may also use detection data from, for example, a three-axis magnetic sensor and/or a three-axis acceleration sensor.

The user input reception unit 231 can further determine the position of each of the right hand controller 320 and the left hand controller 330 to detect temporal changes in position of the right hand controller 320 and/or the left hand controller 330. As an example, regarding two groups of bright points identified from the taken image, the user input reception unit 231 may determine the position of the center of gravity of the plurality of bright points forming the left group as the position of the right hand controller 320, and determine the position of the center of gravity of the plurality of bright points forming the right group as the position of the left hand controller 330. In at least one embodiment, the user input reception unit 231 may detect the temporal change in position of each controller 320 or 330 using the detection data of the sensor 306 (for example, acceleration sensor) of each controller 320 or 330.

The user input reception unit 231 may be any kind of means (input receiving device) capable of detecting the physical movement of the player, and is not limited to the above-mentioned controller.

The user operation determination unit 232 is configured to determine whether or not the operation information (for example, the movement velocity of each controller) of each controller 320 or 330 acquired by the user input reception unit 231 represents that a predetermined movement value (for example, velocity or acceleration) is exceeded. In other words, the user operation determination unit 232 determines whether or not the user has moved a controller 320 or 330 for moving an operation target object faster than the predetermined velocity. The predetermined velocity can be set depending on the game content. For example, in the case of a boxing game, the user is assumed to move the hands holding the controllers quickly. Therefore, in the case of a boxing game, the predetermined velocity can be set to a moderately high velocity.

The user operation determination unit 232 may determine whether or not the acceleration of each controller 320 or 330 acquired by the user input reception unit 231 has exceeded a predetermined velocity value. In other words, the user operation determination unit 232 can determine whether the user has moved a controller 320 or 330 for moving the operation target object beyond a predetermined acceleration. The predetermined acceleration can be appropriately set depending on the game content. Further, the user operation determination unit 232 can set a predetermined movement value by combining the velocity and the acceleration related to the movement of the controller.

When the user operation determination unit 232 determines "YES", the change processing unit 233 performs processing for visually changing a part of the game content, which gives a disadvantage to the player in the game. The specifics of the visual change processing giving a disadvantage to the player differ depending on the game content. For example, in the case of a boxing game, the change processing unit 233 can perform processing for visually changing a boxing glove, which is an operation target object, so as to disable the effect of punching an opponent by the player. In at least one embodiment, the change processing unit 233 can generate an alarm sound or display a warning message together with processing for changing the object to be moved by movement of controller 320 or 330. Further, in at least one embodiment, the change processing unit 233 may provide instructions for displaying the fact that the internal game parameters (for example, a durability parameter) have decreased, in addition to performing the processing for changing the object to be moved by movement of controller 320 or 330. In this manner, the user is able to recognize more clearly that the movement has exceeded a predetermined velocity or acceleration value.

In this case, the change refers to giving a disadvantage to the player in the progress of a game scenario compared to a case in which the movement of the user for an object to be operated by the player or to be acted on by the player does not exceed a predetermined velocity. Examples of giving a disadvantage may include deformation of the object or decrease of various parameters (for example, an energy value or an experience value) set to the player, also called the game character. In this manner, the user playing as a player recognizes the state in which giving a disadvantage in the progression of the game content is performed when the movement has exceeded a predetermined movement velocity, and is prompted to suppress the movement so as not to exceed the predetermined movement velocity.

The image generation unit 234 is configured to generate a game image such that the operation target object moves in the computer game in association with the movements of the right hand controller 320 and the left hand controller 330. When the user moves faster than the predetermined movement velocity, the image generation unit 234 generates a game image in the computer game that was processed by the change processing unit 233. For example, the image generation unit 234 acquires predetermined data from the memory unit 220, and generates a game image by computer graphics processing based on the acquired data. The generated game image is output to the display device 120 via the image output unit 235 for display on the display device 120.

Figure 5:
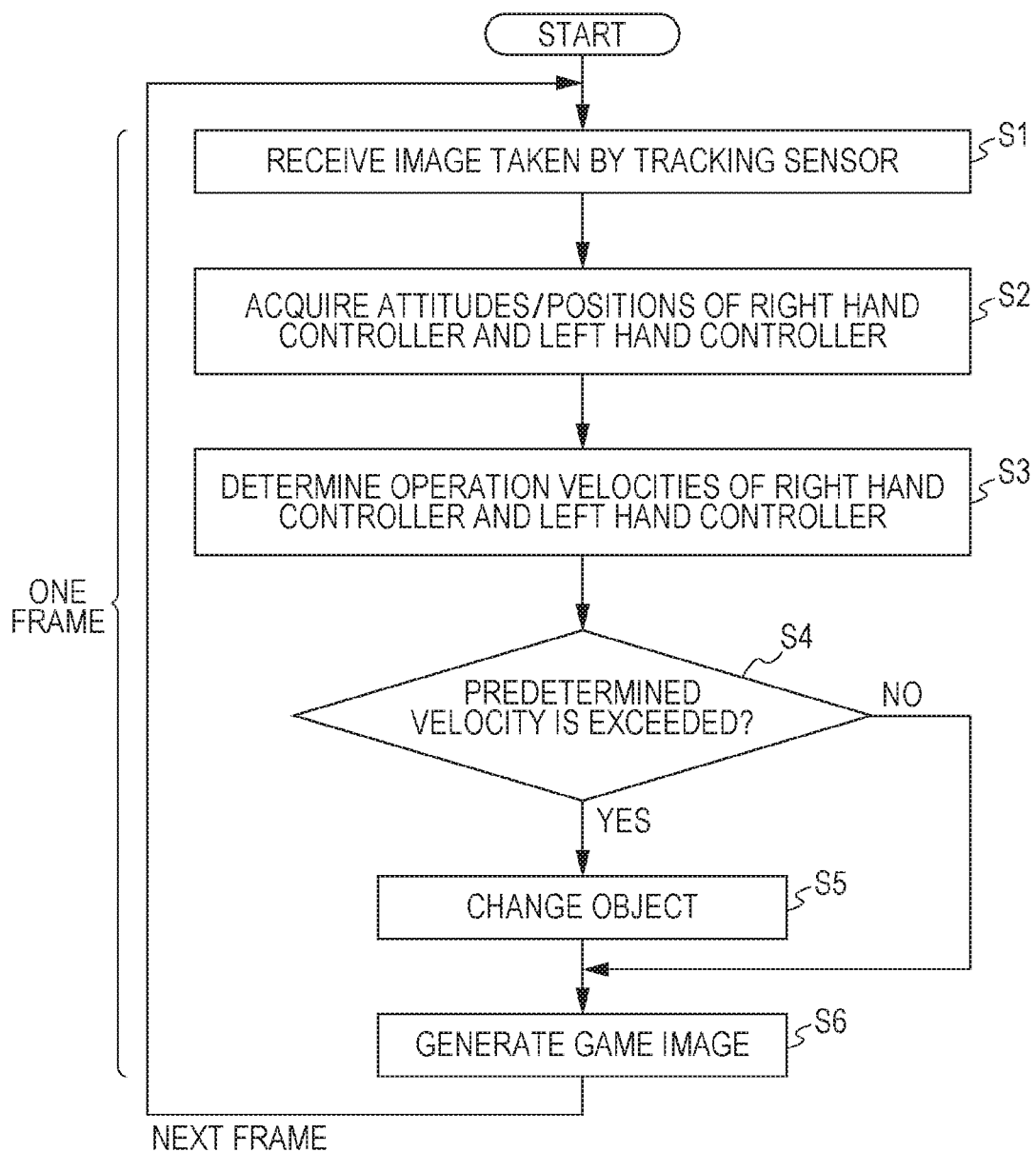
FIG. 5 is a flowchart of a method according to at least one embodiment.

FIG. 5 is a flowchart of a method according to at least one embodiment. This flowchart represents processing of generating a game image of one frame by the game device 200. When processing from the beginning (Step S1) to the end (Step S6) of the flowchart a game image is generated for one frame. After that, the same processing is repeated from the beginning of the flowchart in order to generate the next one frame of the game image.

In Step S1, data on the image taken by the tracking sensor 130 or the detection data output by the sensors 306 of the right hand controller 320 and the left hand controller 330 are output to the game device 200.

In Step S2, the user input reception unit 231 detects the attitude of each of the right hand controller 320 and the left hand controller 330 based on the received taken-image data or detection data. The user input reception unit 231 can further detect the positions of the right hand controller 320 and the left hand controller 330 based on the taken-image data or the detection data.

In Step S3, the user input reception unit 231 detects the velocities of the right hand controller 320 and the left hand controller 330 based on the temporal change in position described above.

In Step S4, the user operation determination unit 232 determines whether or not the operation velocity of each of the right hand controller 320 and the left hand controller 330 has exceeded a predetermined value (for example, a predetermined velocity).

When the operation velocity of the user has exceeded the predetermined movement value (for example, velocity), in Step S5, the change processing unit 233 changes the operation target object or an enemy object such that a disadvantage is given to the player compared to a situation where the operation velocity with equal to or less than the predetermined movement value. This change includes weakening the operation target object or strengthening the enemy object.

In Step S6, a game image in which the operation target object moves in the game image is generated based on the operation specifics of the player. In Step S5, the image output unit 235 outputs the generated game image to the display device (for example, HMD) 120. Thus, a game image of the operation target object in the computer game, which is associated with the movement of the user, is displayed on the display device 120. The user 160 can move the operation target object in the computer game in association with the operations of the right hand controller 320 held by the right hand and the left hand controller 330 held by the left hand.

Figure 6:
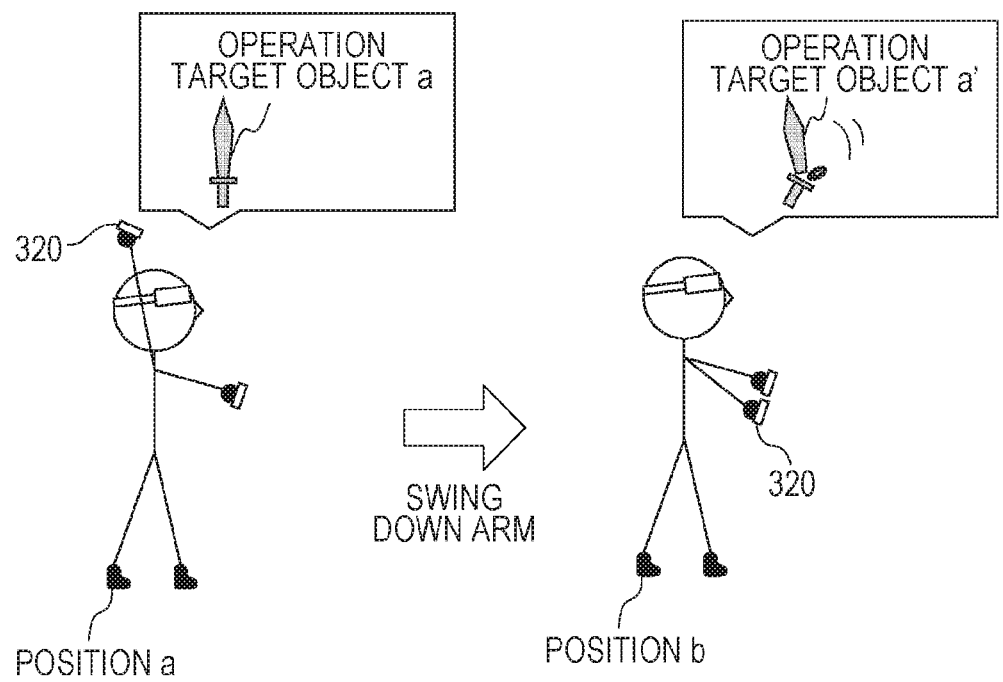
FIG. 6 is a diagram of an example of a change in a display of and operation target object in a game system according to at least one embodiment.
Figure 7:
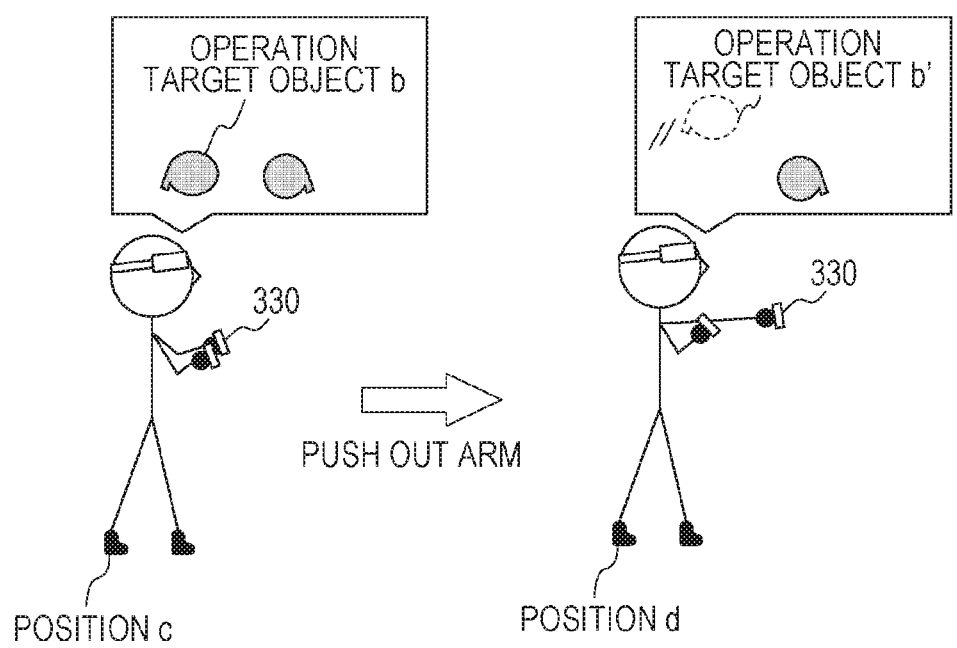
FIG. 7 is a diagram of an example of a change in a display of an operation target object in a game system according to at least one embodiment.

FIG. 6 and FIG. 7 are each a diagram of changing the operation target object according to at least one embodiment. For example, in FIG. 6, the user 160 wearing the head mounted display is playing a battle game for fighting enemies using the controllers 320 and 330, and a "sword" is illustrated as an example of the operation target object. The player swings up the right hand controller 320 (position a), and then swings down the right arm (position b). The "sword" (operation target object a) in the virtual reality space is controlled in association with the movement of the user. Thus, when the user swings down the arm quickly, the operation target object can be moved quickly in association with the movement. When the user 160 swings down the controller 320 faster than the predetermined velocity from the position a to the position b, the "sword" is changed and displayed such that the "sword" is "broken" or "cracked" from the normal state (operation target object a') and the object to be operated gets broken. Then, the user 160 is restricted from damaging the enemy. As a result, the user is prompted to avoid moving the operation target object faster than necessary, and can enjoy the game in a more controlled manner while maintaining the association between the controller and the object. Similarly, even when the user swings around the controller with momentum, the "sword" can be changed and displayed.

In the example in FIG. 7, the user 160 wearing the head mounted display is playing a boxing game using the controller 330, and a "boxing glove" (operation target object b) is illustrated as an example of the operation target object. In at least one embodiment, when the user 160 pushes out the controller 330 faster than the predetermined velocity from a position c to a position d for operation, the "boxing glove" is displayed with a change such as having increased transparency or blurring thereof (operation target object b'). The operation object may be displayed so as to pass through a body of an opponent character. In this manner, when the operation of the user has exceeded a predetermined limit value, the user can visually recognize that his or her own action is invalidated or disabled in the game.

Figure 8:
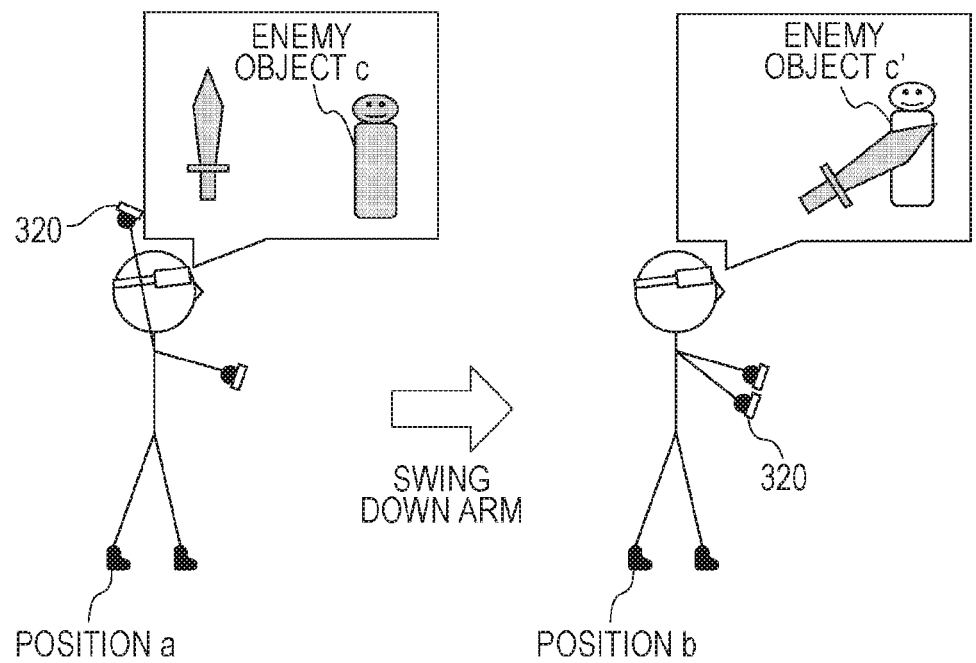
FIG. 8 is a diagram of an example of a change in a display of an enemy object in a game system according to at least one embodiment.

FIG. 8 is a diagram of changing an object in game content according to at least one embodiment. The user 160 wearing the head mounted display is playing a battle game for fighting an enemy (enemy object c) using the controllers 320 and 330. The user playing as a player swings up the right hand controller 320 (position a), and swings down the right arm (position b). The "sword" (operation target object a) in the virtual reality space is controlled in association with this user movement. Thus, when the user swings down the arm quickly, the operation target object can be moved quickly in association with the movement. When the user 160 swings down the controller 320 faster than the predetermined velocity from the position a to the position b, the enemy object is changed from a normal state (enemy object c) to a transparent state (enemy object c'), and the sword is displayed in such a manner as to pass through the enemy object, to thereby prevent the player from damaging the enemy. As a result, the user is prompted to avoid operating the operation target object faster than necessary, and can enjoy the game in a more controlled manner while maintaining the association between the controller and the object.

In at least one embodiment, when the movement of the hand of the player wearing the HMD has exceeded a certain velocity, a predetermined parameter of a player character associated with the player may be decreased. With this, a disadvantage is given to the player in the game compared to a case in which the movement of the hand of the player does not exceed the certain velocity. For example, the predetermined parameter includes various kinds of parameters in the game such as a hit point (an energy value indicating an allowable damage amount. When the energy value falls below a predetermined value, the player character cannot be operated.), attack power (an amount of damage that can be given to an enemy character or the like by one attack), or defense power (an amount by which the hit point of the player character is reduced by one attack from the enemy character). In at least one embodiment, the display device 120, e.g., HMD, may display a scale or rating to show the detected physical movement velocity with the predetermined velocity. In at least one embodiment, the detected physical movement velocity is displayed as a comparison with the predetermined velocity In at least one embodiment, the user wearing an HMD plays a golf game using a game controller. When the player operates the game controller to operate a golf club, which is an operation target object, faster than the predetermined movement value, a golf club object in the virtual reality space may be changed and displayed so as to bend, or a golf ball object may be displayed in a transparent manner. Then, the player can no longer hit the golf ball, and the user is prompted to operate the club at an appropriate velocity.

In at least one embodiment, the user wearing the HMD plays a baseball game using the game controller. When the user playing as a batter operates a bat, which is an operation target object, faster than the predetermined velocity, the bat is changed and displayed so as to be, for example, broken, cracked, transparent, or translucent. Then, the player cannot hit the ball, and the user is prompted to operate the bat at an appropriate velocity.

While some embodiments of this disclosure have been described above, this disclosure is not limited thereto, and various modifications can be made thereto without departing from the spirit of this disclosure.

What is claimed is:

1. A non-transitory computer readable game medium storing instructions for controlling an operation of a game system,
the game system comprising:
a head mounted display (HMD);
a processor;
a memory; and
a controller separate from the HMD, wherein the controller is in communication with the HMD,
wherein the processor is configured to execute the instructions to:
receive movement information related to a detected position of the controller;
determine a movement velocity of the controller based on a temporal chance of the detected position of the controller;
cause the HMD to display a virtual reality space for forming a game; and
cause the HMD to display, in the virtual reality space, an operation target object to be operated by the user in response to the detected physical movement of the user and detected by the controller, wherein a character object in the virtual reality space corresponds to the user, and the character object is equipped with the operation target object, and
the operation target object is displayed as a weapon to be used by the character object in the virtual reality space,
breaking the weapon in response to the detected physical movement of the user exceeding a predetermined velocity in comparison to a case in which the detected physical movement of the user is equal to or less than the predetermined velocity.

2. The non-transitory computer readable game medium according to claim 1, wherein breaking the weapon comprises changing at least one of a state of the operation target object or a state of an object to be acted on by the operation target object in response to the physical movement of the user exceeding the predetermined velocity.

3. The non-transitory computer readable game medium according to claim 1, wherein breaking the weapon comprises changing a state of the character object.

4. The non-transitory computer readable game medium according to claim 2, wherein breaking the weapon comprises changing a state of the character object.

5. The non-transitory computer readable game medium according to claim 3, wherein breaking the weapon comprises:
changing the state of the character object by changing a parameter of the character object; and
causing the HMD to display a visual effect showing a visual change to the character object; the visual effect depending on the parameter of the character object that is changed.

6. The non-transitory computer readable game medium according to claim 1, wherein breaking the weapon further comprises limiting an interaction of the movable object with the object to be acted on.

7. The non-transitory computer readable game medium according to claim 2, wherein breaking the weapon further comprises reducing at least one attribute of the character object.

8. A non-transitory computer readable game medium storing instructions for controlling an operation of a game system,
the game system comprising:
a head mounted display (HMD);
a processor;
a memory; and
a controller separate from the HMD, wherein the controller is in communication with the HMD,
wherein the processor is configured to execute the instructions to:
receive movement information related to a detected position of the controller;
determine a movement velocity of the controller based on a temporal change of the detected position of the controller;
cause the HMD to display a virtual reality space for forming a game; and cause the HMD to display, in the virtual reality space, an operation target object to be operated by the user in association with movement of the user detected by the controller, give a disadvantage to the operation target object in response to the movement of the user exceeding a predetermined velocity in comparison to a case in which the movement of the user is equal to or less than the predetermined velocity, wherein a character object in the virtual reality space corresponds to the user, and the character object is equipped with the operation target object, the operation target object is displayed as a weapon to be used by the character object in the virtual reality space, and giving the disadvantage to the player comprises:

breaking the weapon in response to the detected physical movement of the user exceeding a predetermined velocity in comparison to a case in which the detected physical movement of the user is equal to or less than the predetermined velocity; and causing the HMD to display a visual effect of the operation target object depending on the state of the operation target object.

9. The non-transitory computer readable game medium according to claim 2, wherein giving the disadvantage to the player comprises changing the state of the operation target object.

10. The non-transitory computer readable game medium according to claim 1,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

11. The non-transitory computer readable game medium according to claim 2,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

12. The non-transitory computer readable game medium according to claim 3,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

13. The non-transitory computer readable game medium according to claim 4,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

14. The non-transitory computer readable game medium according to claim 5,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

15. The non-transitory computer readable game medium according to claim 6,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

16. The non-transitory computer readable game medium according to claim 7,
wherein the input reception device is configured to be held or worn by the user,
wherein the input reception device comprises at least one of a velocity detector for detecting a velocity of the input reception device or an acceleration detector for detecting an acceleration of the input reception device, and
wherein breaking the weapon comprises determining, based on a result of the detection, whether the physical movement of the user has exceeded the predetermined velocity.

17. A method of forming a game comprising:
causing a head mounted display (HMD) of a game system to display a virtual reality space for the game, wherein the game system comprises:
a processor;
a memory; and
a controller separate from the HMD, wherein the controller is in communication with the HMD causing the HMD to display, in the virtual reality space, an operation target object, displayed as a weapon, to be operated by a character object in association with movement of the user detected by the controller, and at least one enemy object to be acted on by the operation target object, wherein the character object is in the virtual reality space and corresponds to the user;

receiving movement information related to a detected position of the controller;

determining a movement velocity of the controller based on a temporal change of the detected position of the controller; and giving a disadvantage to the character object in response to the movement of the user exceeding a predetermined velocity in comparison to a case in which the movement of the player is equal to or less than the predetermined velocity, wherein giving the disadvantage to the character object comprises:

changing a state of the at least one enemy object, and breaking the weapon.

18. A game system, comprising:
a head mounted display (HMD);
a plurality of controllers separate from the HMD, wherein each of the plurality of controllers is in communication with the HMD;
an information processing device, wherein the information processing device is configured to cause the HMD to display a virtual reality space for forming a game, and to cause the HMD to display, in the virtual reality space, an operation target object, displayed as a weapon, to be operated by a character object, corresponding to the user, in association with movement of the user detected by at least one controller of the plurality of controllers; and
a processing unit configured to give a disadvantage to the character object in the game in response to the movement of the user exceeding a predetermined velocity in comparison to a case in which the movement of the user is equal to or less than the predetermined velocity, wherein the processing unit is configured to give the disadvantage by breaking the weapon.

19. A non-transitory computer readable game medium storing instructions for controlling an operation of a game system,
the game system comprising:
a head mounted display (HMD);
a processor;
a memory; and
a plurality of controllers separate from the HMD, wherein each of the plurality of controllers is in communication with the HMD,
wherein the processor is configured to execute the instructions to:
receive information related to a detected position of each of the plurality of controllers;
determine a movement velocity of each of the plurality of controllers based on a temporal change of the detected position for each of the plurality of controllers;

cause the HMD to display a virtual reality space for forming a game; and cause the HMD to display, in the virtual reality space, an operation target object, displayed as a weapon, to be operated by the user in response to the movement velocity of at least one controller of the plurality of controllers, wherein a character object in the virtual reality space corresponds to the user, and the operation target object is displayed as hands of the character object in the virtual reality space, give a disadvantage to the operation target object in response to the movement velocity of the at least one controller of the plurality of controllers exceeding a predetermined velocity in comparison to a case in which the movement velocity of the at least one controller of the plurality of controllers is equal to or less than the predetermined velocity, wherein the disadvantage to the operation target object comprises breaking the weapon.

20. A non-transitory computer readable game medium storing instructions for controlling an operation of a game system,
the game system comprising:
a head mounted display (HMD);
a processor;
a memory; and
a controller in communication with the HMD, wherein the controller is separate from the HMD,
wherein the processor is configured to execute the instructions to:
receive movement information related to a detected position of the controller;
determine a movement velocity of the controller based on a temporal change of the detected position of the controller;
cause the HMD to display a virtual reality space for forming a game;
cause the HMD to display, in the virtual reality space, an operation target object, displayed as a weapon, to be operated by the user in response to the movement velocity, wherein a character object in the virtual reality space corresponds to the user, and
cause the HMD to display at least one enemy object to be acted on by the operation target object,
give a disadvantage to the operation target object in response to the movement velocity exceeding a predetermined velocity in comparison to a case in which the movement velocity is equal to or less than the predetermined velocity, wherein the disadvantage includes preventing the operation target object from acting on the enemy object and breaking the weapon.

* * * * *